United States Patent [19]

Kishi et al.

[11] Patent Number: 4,669,041
[45] Date of Patent: May 26, 1987

[54] BLANK PROFILE SPECIFYING METHOD

[75] Inventors: Hajimu Kishi; Kunio Tanaka; Teruyuki Matsumura, all of Tokyo, Japan

[73] Assignee: Fanuc Limited, Minamitsuru, Japan

[21] Appl. No.: 694,451

[22] PCT Filed: Mar. 27, 1984

[86] PCT No.: PCT/JP84/00138
§ 371 Date: Dec. 24, 1984
§ 102(e) Date: Dec. 24, 1984

[87] PCT Pub. No.: WO84/04407
PCT Pub. Date: Nov. 8, 1984

[30] Foreign Application Priority Data

Apr. 22, 1983 [JP] Japan ................................. 58-071104

[51] Int. Cl.$^4$ ............................................. G06F 15/46
[52] U.S. Cl. ...................................... 364/171; 318/568; 364/474
[58] Field of Search .................. 364/167–171, 364/191–193, 474, 475, 188, 189; 318/568

[56] References Cited

U.S. PATENT DOCUMENTS 3,757,095  9/1973  Kiwiet ............................ 364/171 X
4,445,182  4/1984  Morita et al. ................... 364/171 X
4,519,026  5/1985  Nozawa ......................... 364/171 X
4,530,046  7/1985  Munekata et al. ............. 364/171 X

FOREIGN PATENT DOCUMENTS 0044192  1/1982  European Pat. Off. ............ 364/474

Primary Examiner—Joseph Ruggiero
Attorney, Agent, or Firm—Staas & Halsey

[57] ABSTRACT

A blank profile specifying method in automatic programming for lathes has a step of specifying a finished profile (1), a step of entering a maximum length ($L_m$) and a maximum diameter ($F_m$) of a blank profile (2), a step of obtaining the maximum length ($L_t$) and the maximum diameter ($F_t$) of the finished profile from entered finished profile data, a step of calculating an uncut thickness ($t_z$) longitudinally of the blank and an uncut thickness ($t_x$) diametrically of the blank by using $L_m$, $L_t$, $F_m$, $F_t$, a step of obtaining the blank profile (2) by enlarging the finished profile by the uncut thicknesses in the respective directions, and displaying the blank profile and the finished profile, a step of entering position data indicative of inflection points ($P_1$, $P_2$ ... $P_5$) of an actual blank profile, and a step of storing the entered position data indicative of the inflection points and modifying the display of the blank profile by using the position data.

3 Claims, 8 Drawing Figures

BLANK PROFILE SPECIFYING METHOD

BACKGROUND OF THE INVENTION

This invention relates to a blank profile specifying method in automatic programming for lathes. More particularly, the invention relates to a blank profile specifying method well-suited for specifying the profile of a blank in cases where the blank has a special profile other than that of a cylinder or hollow cylinder.

Automatic programming systems for lathes have come into practical use and are used to create NC tapes from a design drawing through a simple operation by entering data in a conversational mode using a graphic display screen. With such an automatic programming system, a machining profile (exclusive of dimensions) can be entered merely by pressing profile symbol keys, which are located on an operator's panel, corresponding to a workpiece profile written on a design drawing. Further, according to the automatic programming system, referential information is graphically displayed on the screen from time to time and inquiries are made in ordinary language, so that dimensions and various data can be entered in response to the inquiries. When all data necessary for creation of an NC tape have been entered, the system immediately displays the blank profile and the finished profile, begins automatic calculation of NC command data and graphically displays a tool path to create an NC tape. A programming method performed by such an automatic programming system will now be described in detail. The method comprises the following steps:

(1) drawing mode selection step;
(2) blank and blank dimensions input step;
(3) machining profile and machining profile dimensions input step;
(4) machine reference point and turret position input step;
(5) process selection step;
(6) tool selection step;
(7) machining area and cutting conditions designation step; and
(8) tool path calculation step.

The necessary data are entered successively to eventually create the NC tape. In the first step of selecting a drawing format, a coordinate system in line with the method of entry of the dimensions on the design drawing is selected from the information displayed on the graphic display screen. Specifically, four drawings indicative of drawing format and their menu numbers 1, 2, 3, 4 appear on the screen along with an inquiry calling for selection of a coordinate system. Keys on a keyboard are operated in response to the inquiry, and one of the keys is used to enter a menu number and, hence, select a coordinate system.

In the second step for entering a blank and the dimensions thereof, a picture for entering a blank profile and its dimensions appears on the graphic display screen, as shown in FIG. 1. While viewing the picture displayed, one enters the blank, its dimensional values L, D, $D_o$, and the position of a base line ZP. Specifically, since the types of blank for turning are broadly classified into a cylinder, hollow cylinder and special profile (special blank), the images of these blanks and their menu numbers appear on the display screen, one of the blanks is selected from among the displayed blanks by entering its menu number, then, in accordance with inquiries calling for dimensional values, namely the length L, thickness D, bore diameter $D_o$ and base line ZP of the blank, these dimensions are entered via the keyboard. This completes the entry of the blank and dimensional values.

In the third step for entering machining profile and dimensions, (a) coordinate axes and the blank profile, as well as a machining profile inquiry, are displayed on the screen, and one responds to the inqury, while observing the design drawing, by pressing a profile symbol key on the keyboard in accordance with the profile on the design drawing, thus to enter the machining profile, and (b) following the entry of the machining profile, the display screen makes an inquiry requesting the necessary dimensions, and dimensions taken from the design drawing are entered from the keyboard in response to the inquiry, thereby completing the entry of a machining profile and its dimensions. A finished profile conforming to the entered machining profile and dimensions will appear on the graphic display screen.

In the fourth step for entering machine reference point and turret position, a drawing showing the positional relationship among the finished profile, turret and machine reference point is displayed together with an inquiry requesting a machine reference point and turret index position, which are necessary for creating NC data. The prescribed numerical values are entered from the keyboard in response to the inquiry to complete the entry of machine reference point and turret index position.

In the fifth step for process selection, a prescribed machining process is selected. Specifically, when a single part is to be machined by a lathe, the machining processes available include (a) center drilling, (b) drilling, (c) rough cutting of outer diameter, (d) rough cutting of inner diameter, (e) semi-finishing of outer diameter, (f) semi-finishing of inner diameter, (g) outer diameter finishing, (h) inner diameter finishing, (i) grooving and (j) threading. One of these machining processes is selected in the fifth step. To select a machining processing, one need only enter the name of the desired machining process, which is displayed on the display screen, by a menu number in response to an inquiry requesting which process is desired.

In the sixth step for selecting a tool, one responds to inquiries by entering the tool number of a tool to be used, a tool position compensation number, tool nose radius, virtual nose position, nose angle, etc.

In the seventh step for determining machining area and cutting conditions, one responds to inquiries on the screen by entering clearance, finishing allowance, depth of cut, retraction amount, cutting speed, feedrate, etc.

In the eighth step for calculating tool path, NC data indicative of tool path are obtained by using all of the data entered in the first through seventh steps, tool trajectory is displayed on the basis of the NC data, and the NC created are delivered as an output.

In an automatic programming method of this kind, there are cases where the blank entered in the second step is a special blank. In such cases an NC tape is created by taking it for granted that the uncut thickness of the special blank with respect to the finished profile along each of its axes is uniform. In other words, a special blank which will have a uniform uncut thickness along each of its axes with respect to a finished shape is prepared in advance. When the dimensions of this special blank are to be entered, data $t_x$, $t_z$ indictive of the uncut thicknesses along the respective axes are entered, and a tool path is eventually calculated by using these data. FIG. 2 is a sectional view (showing only a first quadrant) of a finished profile 1 (solid line) and special blank profile 2 (dashed line). The uncut thickness $t_x$ along the X axis is constant throughout, and the same is true of the thickness $t_z$ along the Z axis. Points $P_1$, $P_2$... $P_5$ are points of inflection.

Cast articles are often special blanks and in many cases do not have a uniform uncut thickness with respect to a final finished profile. Calculating the tool path is difficult when uncut thickness is non-uniform. For this reason, automatic programming in the prior art is performed by taking it for granted that uncut thickness is uniform. In actual machining, however, this results in idle cutting and prolonged machining time. Other prior-art methods include a method of automatic programming by specifying blank profile, and a method of cutting by assuming that a blank is a cylinder. However, the former method results in complicated programming because the blank profile cannot be specified simply, and the latter method results in idle cutting when actual machining is carried out.

SUMMARY OF THE INVENTION

An object of the present invention is to provide a blank profile specifying method in automatic programming for lathes whereby the profile of a special blank can be specified accurately through a simple method.

Another object of the present invention is to provide a blank profile specifying method in automatic programming for lathes whereby idle cutting will not occur even when cutting is performed based on created NC data.

The present invention provides a method of specifying a blank profile in automatic programming for lathes, which method has a first step of displaying, on a display unit following entry of a final, finished profile, the final, finished profile as well as a blank profile having a uniform uncut thickness with respect to the final, finished profile, a second step of entering position data indicative of an inflection point of an actual blank profile, a third step of storing the entered position data indicative of the inflection point and modifying a blank profile displayed on the display unit by using the position data, and a step of specifying the blank profile by repeating the second and third steps for each inflection point. According to this method, the dimensions of a special blank can be specified in a simple manner and idle cutting will not occur even when cutting is performed based on created NC data.

DESCRIPTION OF PREFERRED EMBODIMENTS

Figure 1:
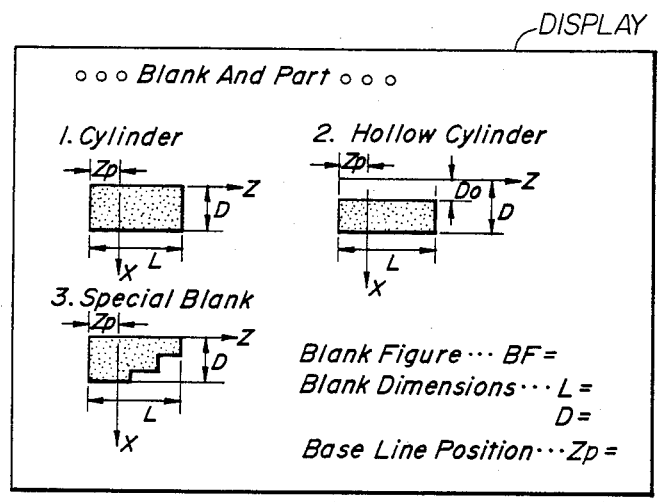
FIG. 1 is a view for describing a conventional method of entering a blank as well as the dimensional values thereof.
Figure 2:
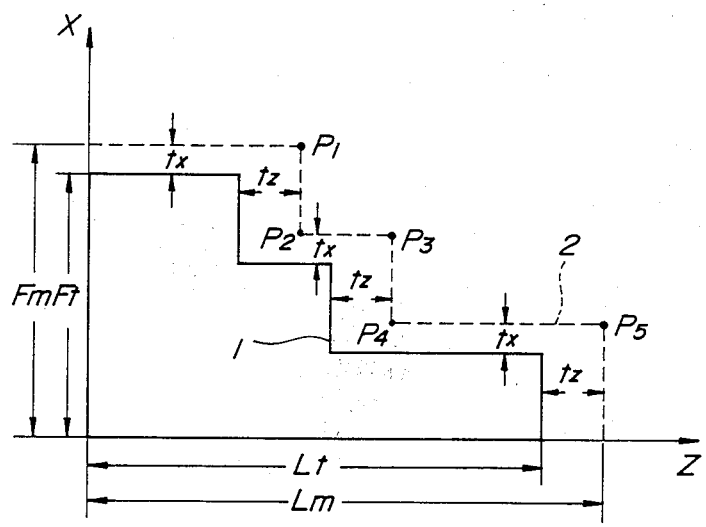
FIG. 2 is a sectional view showing the relationship between a finished profile and a profile of a special blank when the uncut thickness is constant.
Figure 3:
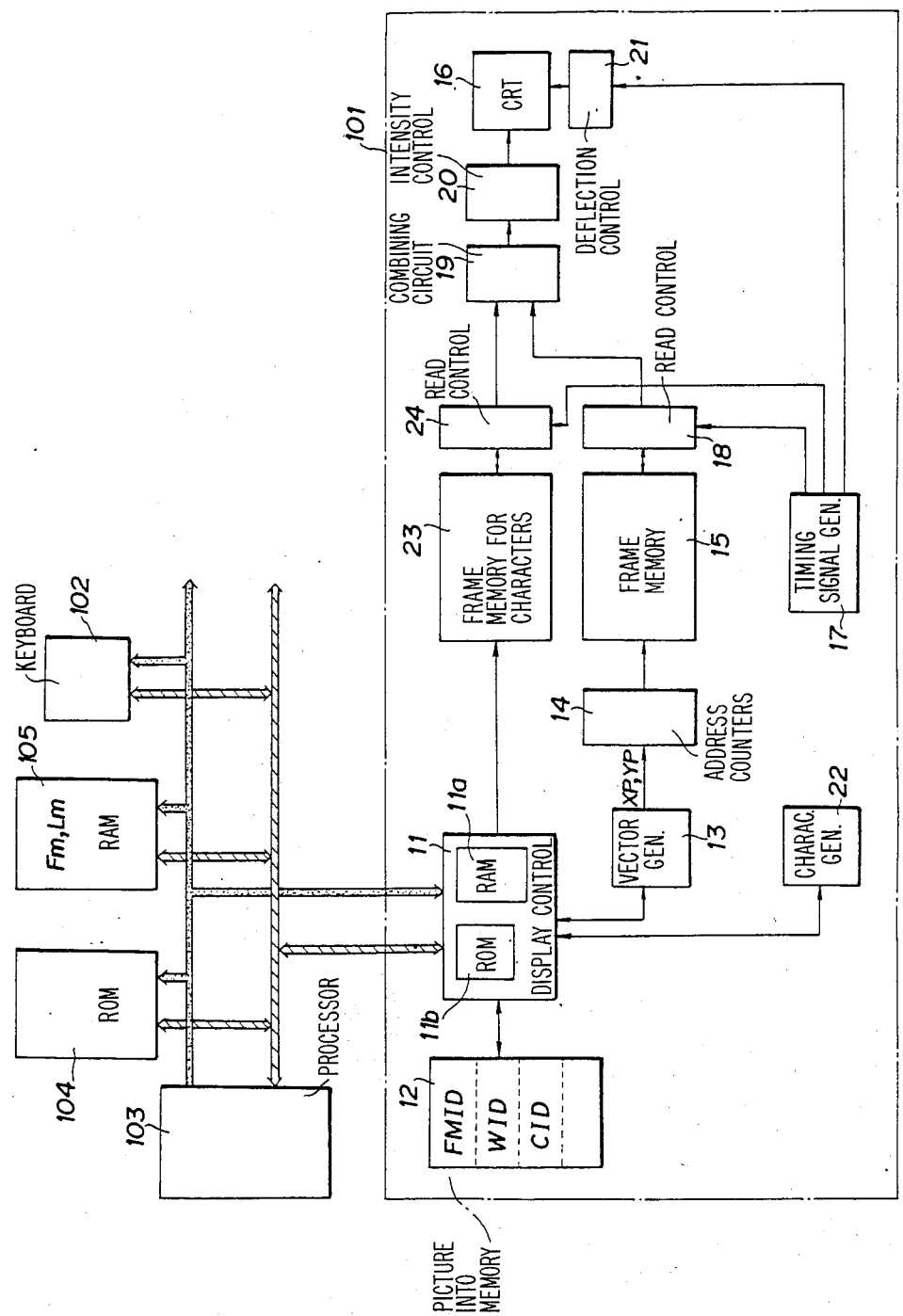
FIG. 3 is a block diagram showing an embodiment of an automatic programming apparatus for practicing the present invention.

As in the prior art, (1) a drawing format is selected, (2) a blank and the dimensions thereof are entered, and (3) a machining profile and the dimensions thereof are entered by a keyboard 102 in a conversational mode with a graphic display unit 101, as shown in FIG. 3. In the step for entering the blank and its dimensions, we shall assume that a special blank is selected and that the length $L_m$ (L in FIG. 1) of the special blank along the Z axis and the maximum diameter $F_m$ (D in FIG. 1) thereof along the X axis are entered from the keyboard 102. We shall also assume that the profile indicated by the solid line 1 in FIG. 2 is the finished profile. When the data associated with steps (1) through (3) have been entered, a processor 103 stores the data in a RAM 105 under the control of a control program stored in a ROM 104.

When the entry of machining profile and its dimensions in step (3) is completed, the processor 103, under the control of the control program, successively delivers the machining profile and dimension data, as well as the blank profile data, which have been stored in the RAM 105, to the graphic display unit 101.

The graphic display unit 101 has a display controller 11, which is constituted by a computer, for temporarily storing the delivered data in a RAM 11a, and for subsequently generating finished profile picture information (data indicating the distinction between straight lines and circular arcs, as well as starting points and end points, etc.) by using the machining profile and dimension data stored in the RAM 11a, this being performed on the basis of a display processing program stored in a ROM 11b, and storing the finished profile picture information FMID in a picture information memory 12. It should be noted that picture information for displaying coordinate axes also is stored in the picture information memory 12.

Next, the display controller 11 obtains the maximum length $L_t$ along the Z axis, and the maximum diameter $F_t$ along the X axis, of the finished profile, and stores these in the RAM 11a.

Thereafter, using the Z-axis maximum length $L_t$ and the X-axis maximum diameter $F_t$ of the of the finished profile, as well as the Z-axis maximum length $L_m$ and X-axis maximum diameter $F_m$ of the special blank, the display controller 11 obtains the aforementioned uncut thicknesses $t_x$, $t_z$ for a case where uncut thickness is uniform. More specifically, the display controller performs operations given by the following expressions:

$$F_m - F_t \rightarrow t_x$$

$$L_m - L_t \rightarrow t_z$$

to compute the X- and Z-axis uncut thicknesses $t_x$, $t_z$ of the special blank with respect to the finished profile.

When the uncut thickness $t_x$, $t_z$ have been found, the display controller 11 uses these uncut thicknesses and finished profile data to create picture information WID indicative of the special blank profile, which information is obtained by enlarging the finished profile by $t_x$ along the X axis and by $t_z$ along the Z axis. The picture information is stored successively in the picture information memory 12. It should be noted that the picture information indicative of the special blank is obtained by converting coordinate values (x,z) of starting and end points, etc., which are contained in the finished profile picture information FMID, into (x',y') in accordance with the following expressions:

$$x + t_x \rightarrow x'$$

$$z + t_z \rightarrow z'$$

In concurrence with the processing for creating the abovementioned picture information, the display controller 11 obtains the number m of inflection points (points $P_1$, $P_2$... $P_5$ in FIG. 2) of the special blank profile, stores these in the RAM 11a, creates picture information CID for character generation in order to display the letters of the alphabet A, B, C ... E near the respective inflection points and the letters of the alphabet X, Z on the respective coordinate axes, and stores this picture information in the picture information memory 12.

When the creation of the picture information is completed, the display controller 11 reads the picture information out of the picture information memory 12 in succession and, if the picture information is vector information, applies the information to a vector generator 13. The vector generator 13 uses the picture information input to perform an ordinary linear or circular interpolation calculation, thus to generate interpolated pulses XP, YP along the respective axes, which pulses are applied to an address counter 14. The latter has two address counters, one for the X and the other for the Y axis. These count the interpolated pulses along the respective axes and write a "1" into a storage location of a frame memory 15 which is designated by the X- and Y-axis address counters each time. The frame memory 15 is of matrix construction and has one-bit storage locations corresponding to the pixel positions of the cathode-ray tube display screen. Each time an interpolation pulse is generated, a "1" is written into a storage location at a matrix crosspoint designated by the X-and Y-axis address counters. When a graphic has been stored in the frame memory 15 by the foregoing processing, the stored information is subsequently read out of the frame memory 15 in synchronism with the deflection of the CRT beam (this is referred to as raster scanning), and intensity modulation is performed using the stored information to display the finished profile, blank profile and coordinate axes on a cathode-ray tube 16. It should be noted that a timing signal generator 17 produces a timing signal for reading the stored information out of the frame memory 15, and a timing signal for deflecting the beam. A read controller 18 reads the stored information out of the frame memory 15 on the basis of the timing signal and applies the stored information to an intensity controller 20 via a combining circuit 19. The intensity controller 20 performs intensity modulation based on the stored information. A deflection controller 21 deflects the beam horizontally and vertically in synchronism with the timing signal. It should be noted that the blank profile is displayed in the form of a dashed line.

Figure 4A:
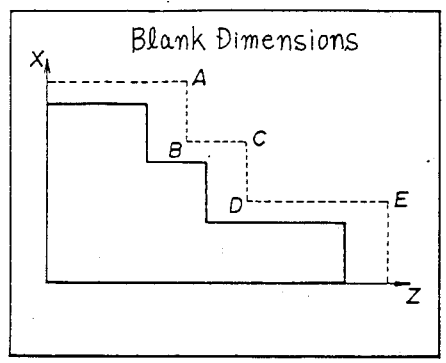
FIGS. 4(A)-4(D) are views showing examples of displays on a display screen and are useful in describing the present invention.

If the picture information read out of the picture information memory 12 is a character code, the display controller 11 reads the character pattern indicated by the character code out of a character generator 22 and stores the pattern in a frame memory 23 for character pattern storage. Thereafter, a read controller 24 sequentially reads the stored information out of the frame memory 23 in synchronism with a timing signal produced by the timing signal generator 17. The combining circuit 19 combines this information with the signal read out of the frame memory 15 and applies the result to the intensity controller 20 to undergo intensity modulation. Through the foregoing control, the picture shown in FIG. 4(A) is displayed on the cathode-ray tube 16.

Figure 4B:
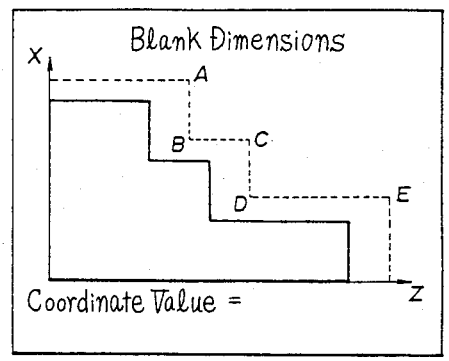

Next, under the control of the control program stored in the ROM 11b, the display controller 11 creates character code data for displaying the inquiry
"COORDINATE VALUE="
generates character patterns by using the character code data, stores the character patterns in the frame memory 23 and displays them on the cathode-ray tube [see FIG. 4(B)].

Figure 4C:
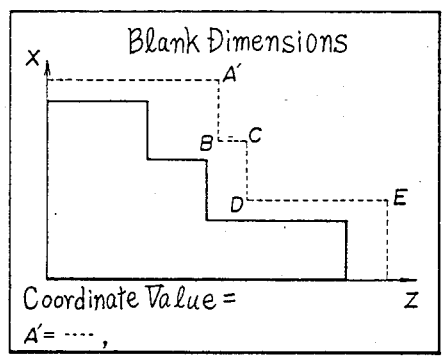

In response to the inquiry calling for the coordinate value of the inflection point, the Z-axis coordinate value of the inflection point A is entered via the keyboard 102, whereupon the coordinate value is stored temporarily in the RAM 105 and then delivered to the display controller 11 under control exercised by the processor 103. When the coordinate value of the inflection point A arrives, the display controller 11 uses the coordinate value to modify the blank profile picture information stored in the picture information memory 12. The arrangement is such that when the initial picture of FIG. 4(A) is generated, a correlation between the inflection points A, B, C ... and picture information corresponding to these inflection points is stored in the RAM 11a. Accordingly, when the modification processing is performed, the picture information corresponding to the inflection point A is read out and the Z-axis coordinate value thereof is replaced by the entered Z-axis coordinate value. Through the foregoing processing, the first inflection point is displayed at the coordinate position actually entered, the letter of the alphabet A' is displayed near the first inflection point, and an inquiry appears requesting entry of position data indicative of the point A', as well as entry of the next inflection point, as depicted in FIG. 4(C). It should be noted that although the letter of the alphabet for the first inflection point is changed from A to A' so that one may recognize that the coordinate of this inflection point has already been entered, this change is not strictly required.

Figure 4D:
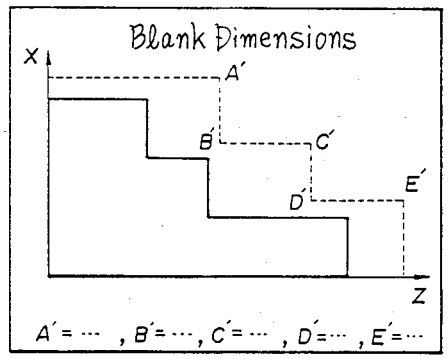
Figure 5:
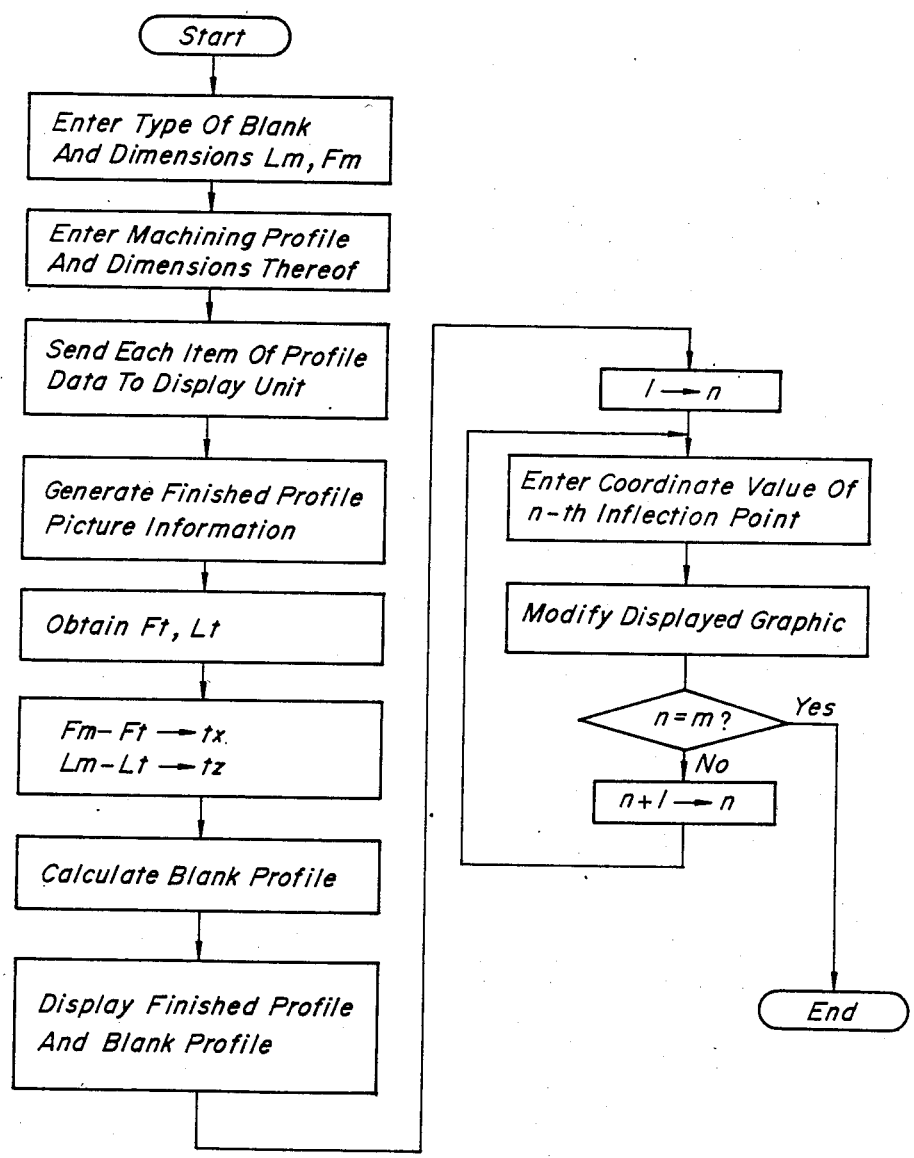
FIG. 5 is a flowchart of processing according to the present invention.

Thereafter, and in similar fashion, the X-axis coordinate value of the second inflection point B, the Z-axis coordinate value of the third inflection point C, the X-axis coordinate value of the fourth inflection point D, and the Z-axis coordinate value of the fifth inflection point E are entered. When this is done, the finished profile and the actual profile of the special blank are finally displayed, as shown in FIG. 4(D), thereby completing the processing for specifying the profile of the special blank.

According to the present invention, the arrangement is such that a blank profile having a uniform uncut thickness with respect to a final, finished profile is obtained, the blank profile is displayed together with the final, finished profile on a display unit, position data indicative of an inflection point of an actual blank profile are subsequently entered, the entered position data indicative of the inflection point are stored, the blank profile displayed on the display unit is modified by using the position data, and the foregoing steps are thenceforth repeated with respect to each inflection point to define the actual blank profile. The profile of a special blank can therefore be accurately defined through a simple operation. In addition, since it is so arranged that the actual special blank profile is entered, a tool path trajectory free of idle cutting can be calculated, and machining time is curtailed. The present invention is therefore well-suited for application to an automatic programming system for lathes.

What is claimed is:

1. A blank profile specifying method in automatic programming for lathes, comprising a first step of entering data which shows that an actual blank profile is a special blank, a second step of specifying a finished profile, a third step of calculating a provisional blank profile having a uniform uncut thickness with respect to said finished profile when the actual blank profile is a special blank, a fourth step of displaying the provisional blank profile and the finished profile on a display unit, a fifth step of entering position data indicative of an inflection point of the actual blank profile, a sixth step of storing the entered position data indicative of the inflection point and modifying the provisional blank profile being displayed on the display unit by making use of said position data to correspond to said actual blank profile, and a seventh step of repeating the fifth and fourth steps for each inflection point to specify the actual blank profile.

2. A blank profile specifying method according to claim 1, comprising a step of entering a maximum length $L_m$ and a maximum diameter $F_m$ of the actual blank profile, a step of obtaining a maximum length $L_f$ and a maximum diameter $F_f$ the finished profile from an entered finished profile, and a step of calculating an uncut thickness $t_z$ longitudinally of the blank and uncut thickness $t_x$ diametrically of the blank from the following expressions:

$$L_m - L_f \rightarrow t_z$$

$$F_m - F_5 \rightarrow t_x$$

said second step being to calculate the provisional blank profile by enlarging the finished profile by $t_z$ longitudinally and by $t_x$ diametrically of the blank.

3. A blank profile specifying method according to claim 2, comprising calculating position data (x', z') indicative of the provisional blank profile from $$z + t_z \rightarrow z'$$

$$x + 5_x \rightarrow x'$$

wherein position data specifying the finished profile is assumed to be (x,z).

* * * * *